(12) United States Patent
Hobbs

(10) Patent No.: US 7,631,721 B2
(45) Date of Patent: Dec. 15, 2009

(54) TILTING VEHICLES

(75) Inventor: Michael Hobbs, Lawn View, Thorn Way, Long Itchington, Southan (GB) CV47 9PF

(73) Assignee: Michael Hobbs, Warwickshire (GB)

(*) Notice: Subject to any disclaimer, the term of this patent is extended or adjusted under 35 U.S.C. 154(b) by 317 days.

(21) Appl. No.: 10/576,401

(22) PCT Filed: Oct. 14, 2004

(86) PCT No.: PCT/GB2004/310567

§ 371 (c)(1),
(2), (4) Date: Jan. 31, 2007

(87) PCT Pub. No.: WO2005/051689

PCT Pub. Date: Jun. 9, 2005

(65) Prior Publication Data

US 2007/0193815 A1    Aug. 23, 2007

(30) Foreign Application Priority Data

Oct. 29, 2003  (GB) .................................. 0325262.4

(51) Int. Cl.
*B60K 17/32* (2006.01)

(52) U.S. Cl. ........................ 180/348; 180/360; 180/378; 180/375

(58) Field of Classification Search ................ 180/348, 180/360, 357, 359, 378, 361, 363, 371, 374, 180/375, 377, 210; 280/124.142, 124.156, 280/124.103, 5.509; 257/424
See application file for complete search history.

(56) References Cited

U.S. PATENT DOCUMENTS

| 2,260,102 | A | * | 10/1941 | Leon ......................... 280/5.509 |
| 2,788,986 | A | * | 4/1957 | Kolbe ....................... 280/5.505 |
| 3,420,327 | A | * | 1/1969 | Nallinger et al. ............. 180/255 |
| 3,572,456 | A |   | 3/1971 | Healy |
| 3,894,602 | A | * | 7/1975 | Von Der Ohe, Manfred ..................... 180/256 |
| 4,003,443 | A |   | 1/1977 | Boughers |
| 4,546,997 | A | * | 10/1985 | Smyers .................... 280/5.509 |
| 4,659,106 | A | * | 4/1987 | Fujita et al. ........... 280/124.103 |
| 4,887,829 | A | * | 12/1989 | Prince ........................ 280/282 |
| 5,692,577 | A | * | 12/1997 | Dornbusch et al. ............ 180/16 |

(Continued)

FOREIGN PATENT DOCUMENTS

EP    1 459 968    9/2004

(Continued)

OTHER PUBLICATIONS

International Search Report for PCT Application No. PCT/GB2004/004346; Filed Oct. 14, 2004; Date of Completion Feb. 28, 2005; Date of Mailing Mar. 14, 2005.

*Primary Examiner*—Paul N Dickson
*Assistant Examiner*—Karen Jane J Amores
(74) *Attorney, Agent, or Firm*—Alston & Bird LLP

(57) ABSTRACT

A tilting chassis vehicle has a differential gear driving opposed half shafts (16,18). Each half shaft is connected to a respective wheel hub. Pivoting tie rods (24,26) are provided between the chassis (12) and these wheel hubs, and a control arm (48) is provided between the chassis and the differential carrier to constrain movement thereof. The arrangement gives a novel tilting vehicle with shaft drive and low centre of gravity.

16 Claims, 6 Drawing Sheets

U.S. PATENT DOCUMENTS

| | | | |
|---|---|---|---|
| 5,765,846 A * | 6/1998 | Braun | 280/124.103 |
| 6,264,241 B1 * | 7/2001 | Horiuchi | 280/781 |
| 6,286,619 B1 * | 9/2001 | Uchiyama et al. | 180/337 |
| 6,763,905 B2 * | 7/2004 | Cocco et al. | 180/210 |
| 7,131,650 B2 * | 11/2006 | Melcher | 280/5.52 |
| 7,343,997 B1 * | 3/2008 | Matthies | 180/215 |
| 7,434,822 B2 * | 10/2008 | Takahashi et al. | 280/124.109 |
| 2005/0253353 A1 * | 11/2005 | Yamamura et al. | 280/124.135 |

FOREIGN PATENT DOCUMENTS

| | | |
|---|---|---|
| FR | 1 515 054 | 6/1968 |
| FR | 2 522 590 | 9/1983 |
| WO | WO 97/09223 | 3/1997 |

* cited by examiner

TILTING VEHICLES

BACKGROUND OF THE INVENTION

The present invention relates to tilting vehicles.

It is known from EP0606191 to provide a three wheel tilting vehicle having a frame with one front wheel for steering and two driving rear wheels. Each rear wheel is mounted on a respective rearward facing swinging arm, each arm having a common balancer pivotably connected to the frame to provide dynamic and static stability to the vehicle. Each rear wheel is provided with a respective chain drive from a differential gear to permit the vehicle to negotiate corners. The common balancer connection allows the vehicle to lean when cornering so that the frame and the wheels are inclined relative to a road surface.

Several problems are associated with this kind of tilting vehicle. The arrangement of the rearward facing swinging arms requires the use of two chain final drives. Whilst the chain drives provide for a convenient power transmission they require periodic lubrication, adjustment and replacement, which is disadvantageous. Furthermore the rearward facing swinging arms are more suited to a relatively upright vehicle such as a motorbike, and may result in a longer wheelbase. There may also be undesirable torque steer effects.

What is required is an improved tilting vehicle which can overcome the aforementioned problems, and maximize road holding characteristics.

SUMMARY OF THE INVENTION

According to a first aspect of the invention there is provided a vehicle including a chassis having a fore and aft axis, a differential gear having a differential carrier, the differential carrier being pivotably mounted relative to the chassis about said axis, the differential gear having two opposite half shafts, each half shaft being connected to a respective wheel hub, the vehicle further including two opposite tie rods, each said wheel hub having one end of a respective tie rod pivotably connected thereto, the other end of the respective tie rod being pivotably connected to the chassis, the differential carrier and the chassis having a control arm pivotably attached therebetween, whereby on cornering of the vehicle the control arm constrains the differential carrier to pivot relative to said chassis, in a predetermined manner.

A vehicle so arranged has the advantage that the angle through which rotary drive is transmitted is constrained when the vehicle executes a corner which controls the stress placed on the drive train. The stress is relieved by controlling the relative orientation of the differential carrier to a road surface. Use of the pivoting differential carrier permits drive shafts to be used as the final drive which is advantageous from a repair and maintenance perspective. A vehicle having a pair of driving wheels so described has improved road holding characteristics when compared to a conventional non-tilting vehicle. Such a tilting vehicle may be operated with a higher cornering speed by virtue of the fact that the centre of gravity of the vehicle is lower to the ground as the vehicle tilts. A tilting vehicle according to the invention is also fun to drive because the frame is able to tilt in the manner of a motorcycle whilst retaining the inherent stability and safety of a three or four wheel vehicle.

Each half shaft may be pivotably connected to a respective wheel hub via an outer universal joint.

In this specification by universal joint we means any coupling such as a hookes joint or a constant velocity joint which can accommodate an axial load and permits rotary drive to be transmitted at an angle.

The respective tie rods may be upper or lower tie rods relative to the associated half shaft, and in a preferred embodiment there are provided upper and lower tie rods, wherein the respective half shaft is arranged therebetween.

The fore and aft axis may be on the geometric centre line of the vehicle, and may pass through the centre of mass which preferably coincides with the geometric centre line.

In a preferred embodiment each half shaft is pivotably connected to the differential gear with an inner universal joint.

Preferably at least one of the respective inner and outer universal joints provides for a change in length of the respective half shaft. This conveniently permits the drive shaft to plunge or extend should suspension movement require a change in length thereof. Controlled pivoting of the differential carrier relative to the road surface permits the drive train to be relieved of stress on cornering of the vehicle, and typically the differential carrier is arranged to pivot relative to the road surface through approximately half of the angle of tilt of the vehicle relative to the road surface.

Preferably the respective tie rods are wishbones of conventional kind, such wishbones providing improved dynamic stability to the vehicle.

The vehicle may further be provided with a suspension means, and in a preferred embodiment such suspension means includes a chassis arm pivotably connected to the chassis, the chassis arm having pivotably connected thereto a compressible suspension unit connected to respective upper tie rods. Alternatively the chassis arm may have a respective compressible suspension unit for a respective upper tie rod associated with each wheels hub.

The differential carrier may be pivotably mounted on the chassis with bearings and in a preferred embodiment there are provided forward and rearward bearings for the differential carrier. Such bearings providing for relative tilting of the differential with minimal friction.

Preferably the respective tie rods are pivotably mounted on a common upper collar, the upper collar being pivotably mounted on the chassis above the differential carrier. In a preferred embodiment the upper collar is coaxially mounted on an upper cylindrical member of the chassis. Bearings may be provided between the upper collar and said upper cylindrical member to minimize friction.

In a preferred embodiment the chassis arm is fixed on the upper collar, and is preferably perpendicular to the ground in the static condition of the vehicle.

Preferably the respective lower tie rods are pivotably mounted on a common lower collar, the lower collar being pivotably mounted on the chassis underneath the differential carrier. In a preferred embodiment the lower collar is coaxially mounted on a lower cylindrical member of the chassis. Bearings may be provided between the lower collar and said lower cylindrical member to minimize friction. The axis of the upper and lower collars are preferably vertically aligned in the static condition of the vehicle.

Preferably a suspension arm is pivotably connected between the upper collar and lower collar. Such a suspension arm adjusts the relative movement of the respective upper tie rods relative to the lower tie rods. In the preferred embodiment the suspension arm ensures equal movement of the upper and lower tie rods. The control arm may be pivotably connected between one of the upper and lower collars, and the differential carrier.

Preferably the vehicle further includes an engine which is fixed relative to the chassis. The engine may have a shaft drive output on said axis and connected to the differential. Alternatively the engine may have a chain drive output perpendicular to said axis and driving a parallel lay shaft, the lay shaft having a universal joint connected to an input member of the differential, the input member on said axis so as to provide for pivoting of the engine relative to the differential carrier.

In an alternative arrangement the engine may be arranged to pivot with the differential carrier. Fixing the engine relative to the differential carrier in this manner avoids the requirement for the universal joint in the drive train.

According to an alternative characterization of the invention there is provided a drive train assembly for a vehicle including a chassis having a fore and aft axis, a differential carrier and a control arm, the differential carrier being pivotably mounted relative to the chassis about said axis, the differential carrier and the chassis having a control arm pivotably attached therebetween, whereby on pivoting of the chassis about said axis the control arm constrains the differential carrier to pivot relative to said chassis, in a predetermined manner.

Such an alternative characterization is a useful assembly which may be used with other features of the invention described above.

BRIEF DESCRIPTION OF THE DRAWINGS

Other features of the invention will be apparent from the following description of a preferred embodiment shown by way of example only in the accompanying drawing, in which.

DETAILED DESCRIPTION OF THE DRAWINGS

Figure 1:
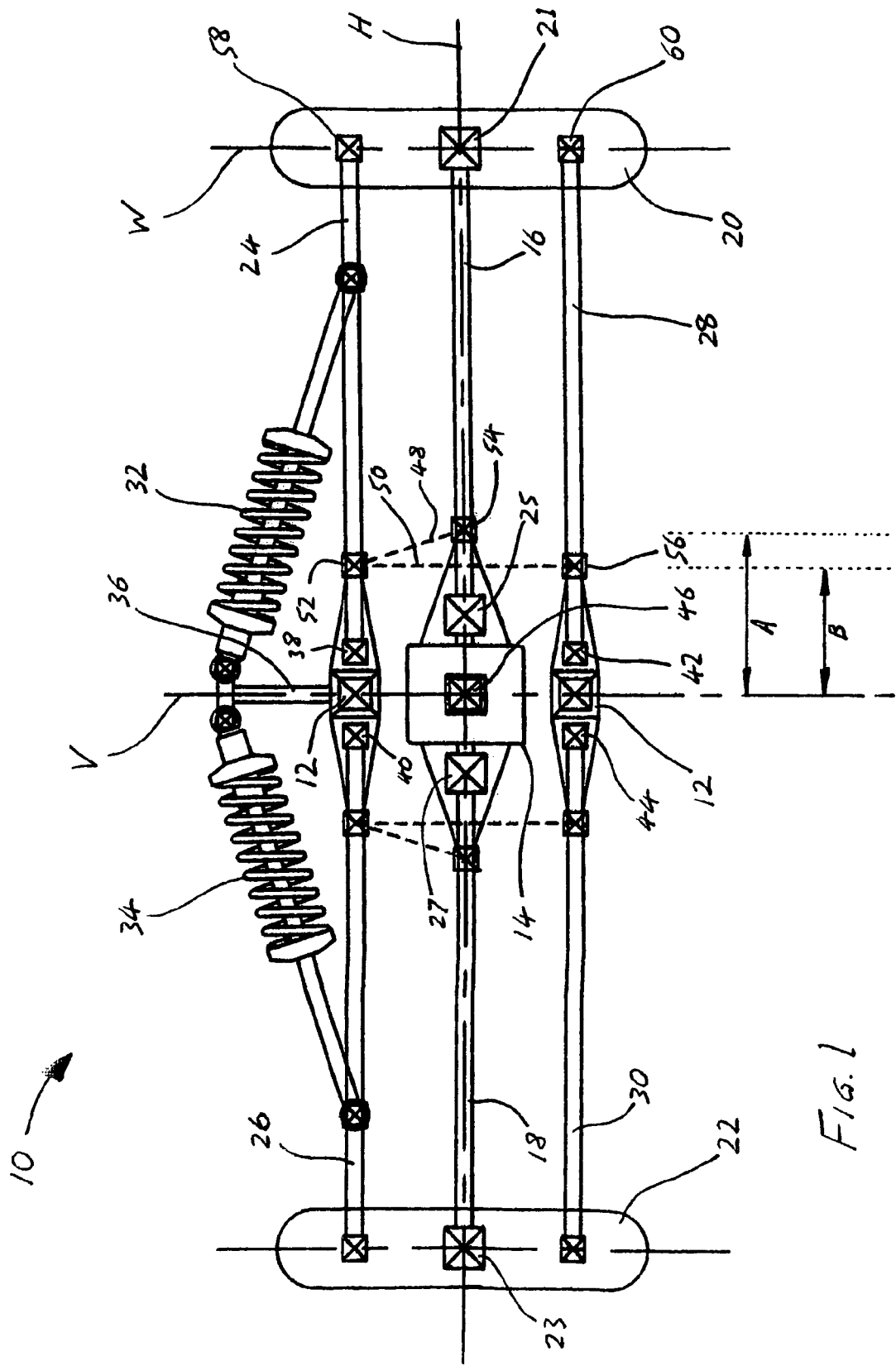
FIG. 1 is a schematic cross section of a pair of driving wheels for a vehicle according to the present invention.

Referring firstly to FIG. 1 there is shown a schematic cross section of a pair of driving wheels for a vehicle according to the present invention, generally designated 10. FIG. 1 shows a vehicle frame 12 with a differential 14. The differential 14 and frame 12 lie on a common vertical centre line V. The differential 14 has two drive shafts 16, 18 which are each connected to a wheel 20, 22 by a respective Constant Velocity (CV) joint 21, 23. The wheels have profiled tyres, such as conventional motorcycle tyres, which are intended to operate at angles of inclination to a road surface. The drive shafts 16, 18 are connected to the differential with respective CV joints 25, 27. In the resting condition the drive shafts 16, 18 lie on a horizontal centre line H.

In FIG. 1 each wheel 20, 22 is provided with a respective upper wishbone 24, 26 and a respective lower wishbone 28, 30. Each upper wishbone 24, 26 is pivotably connected to a respective suspension unit 32, 34. Each suspension unit 32, 34 is pivotably connected to a frame arm 36, the frame arm 36 being pivotably connected to the frame 12. The upper wishbones 24, 26 are pivotably connected at 38, 40 to an upper part of the frame 12. The lower wishbones 28, 30 are pivotably connected 42, 44 to a lower part of the frame 12.

The differential 14 shown in FIG. 1 is pivotably mounted 46 to the frame 12 about the intersection of the vertical centre line V and the horizontal centre line H. Pivoting of the differential 14 relative to the frame 12 is determined by a differential control arm 48 and a suspension control arm 50. The differential control arm 48 is pivotably connected to an upper part of the frame 12 at 52 and to the differential 14 at 54. The suspension control arm 50 is pivotably connected to an upper part of the frame 12 at 52 and to a lower part of the frame 12 at 56. The length A represents the distance of the pivotable connection 54 from the vertical centre line V. The length B represents the distance of the pivotable connections 52 and 56 from the vertical centre line V. The importance of the ratio of the lengths A:B will become apparent from the following description. Also shown in FIG. 1 is a centre line W along which the CV joint 21 of the wheel 20, the pivotable connection 58 of the upper wishbone 24, and the pivotable connection 60 of the lower wishbone 28 lie.

Figure 2:
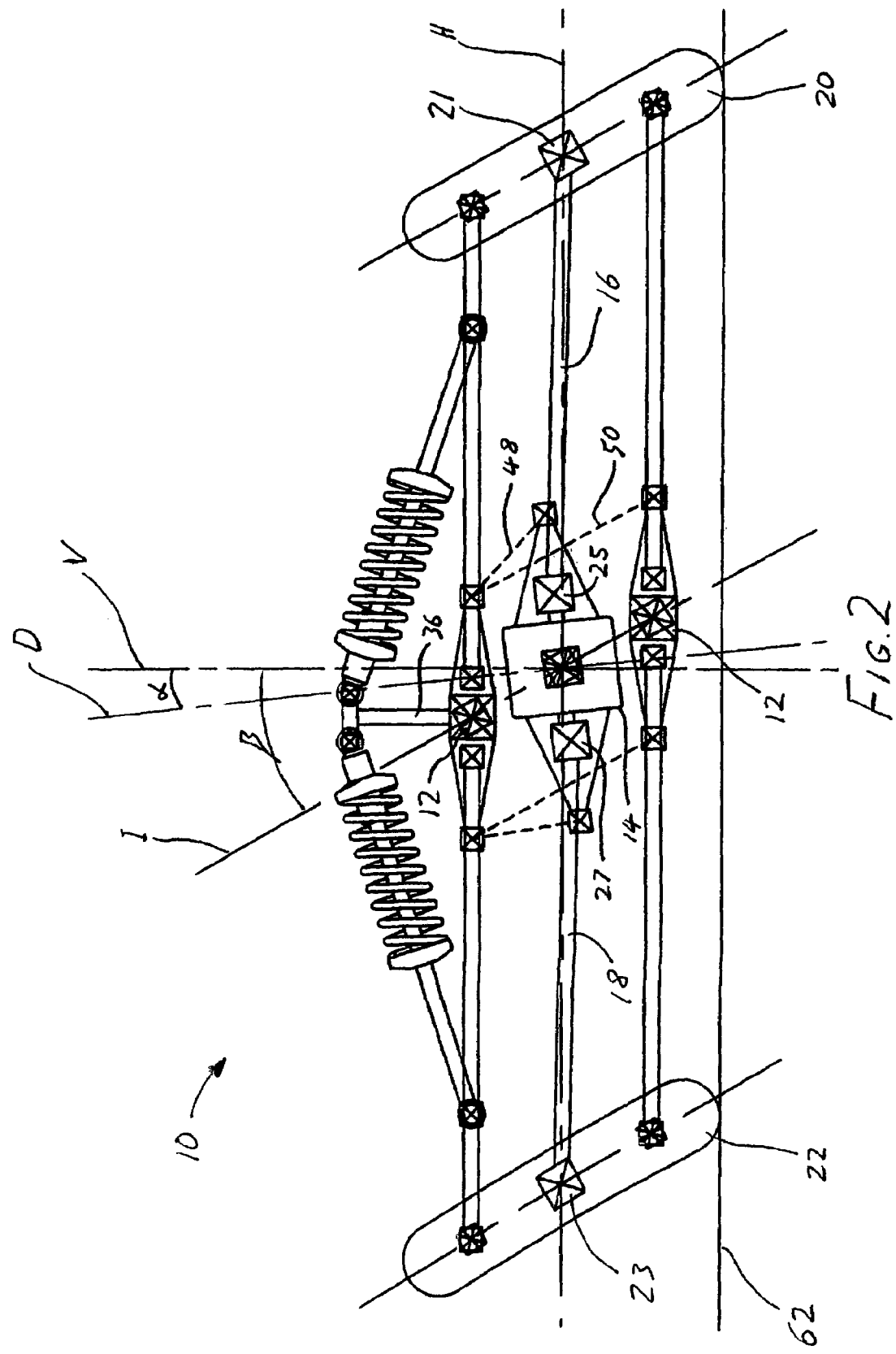
FIG. 2 is a schematic cross section of the driving wheels of FIG. 1 executing a corner.

FIG. 2 shows a schematic cross section of the driving wheels of FIG. 1 inclined at an angle of approximately 45° to a horizontal road surface 62 as the vehicle executes a corner. Like features shown in FIG. 1 are shown with like reference numerals. As the pair of driving wheels 10 execute the corner the differential control arm 48 and the suspension control arm 50 determine the degree of pivoting to the differential relative to the frame 12. Centre line D represents the angle α through which the differential 14 pivots relative to the vertical centre line V. Centre line I represents the angle of inclination β relative to the vertical centre line V. The ratio of lengths A:B determines the ratio β:α. Pivoting of the differential 14 relative to the frame 12 acts to straighten the power train of the differential 14, the CV joints 25, 27, the drive shafts 16, 18 and the CV joints 21, 23 of the wheels 20, 22 so that the drive train is maintained substantially about the horizontal centre line H. Such straightening of the power train eases the stress on the CV joints 21, 23, 25, 27 which do not operate as efficiently at large angles of deviation. Without the pivoting differential 14 the drive train would be under greater stress upon execution of a corner. It can also be seen in FIG. 3 that as the pair of driving wheels 10 execute a corner the frame arm 36 is displaced from the vertical centre line V.

Figure 3:
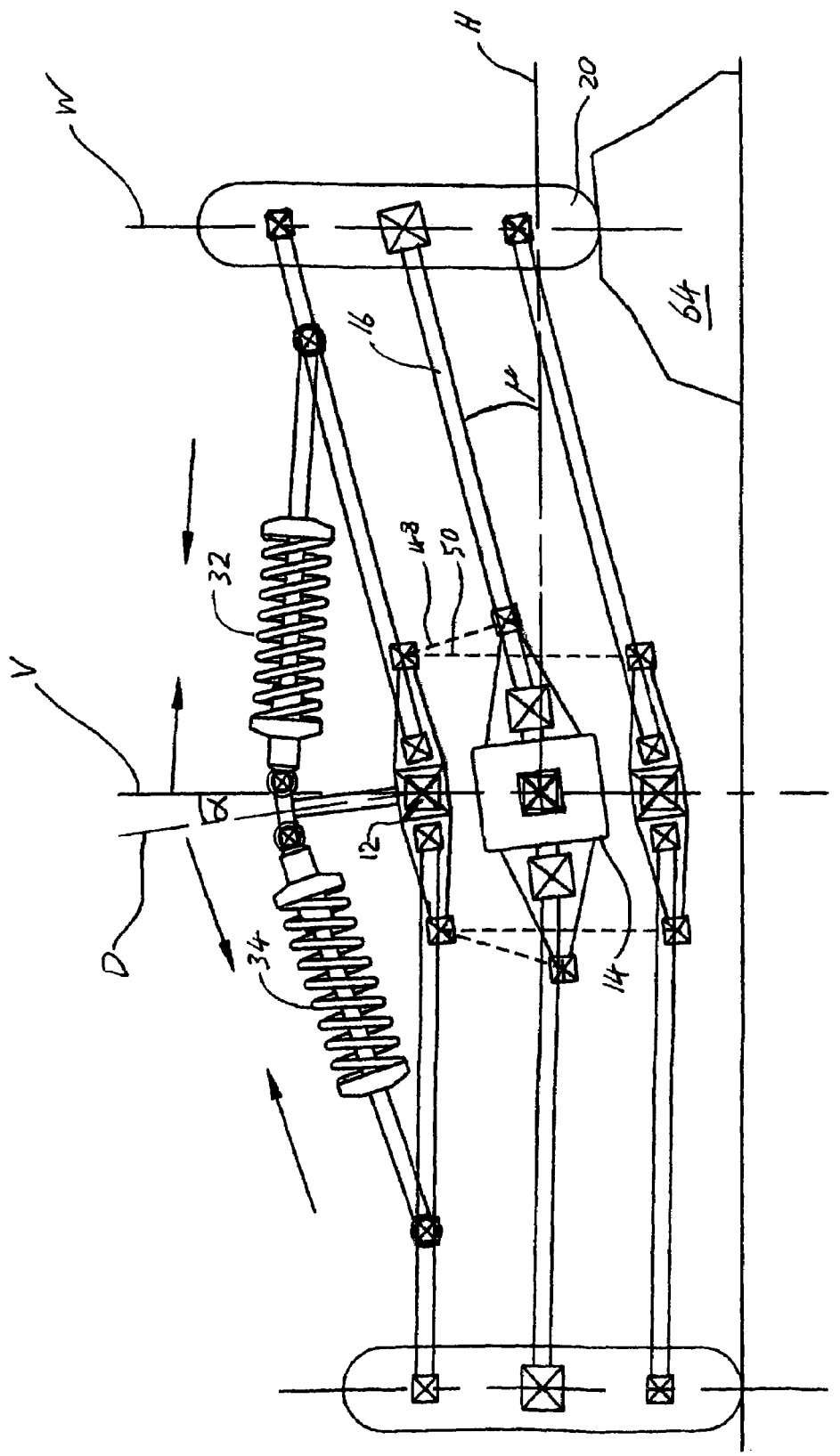
FIG. 3 is a schematic cross section of one of the pair of driving wheels of FIG. 1 travelling over a bump.

Now referring to FIG. 3 there is shown a schematic cross section of one of the pair the driving wheels of FIG. 1 going over a bump 64. As the wheel 20 goes over the bump 64 the differential control arm 48 and the suspension control arm 50 determine the degree of pivoting to the differential 14 relative to the frame 12. Angle μ represents the angle of deviation of the drive shaft 16 from the horizontal centre line H. FIG. 3 shows that the operation of the suspension units 32, 34 whereby the angle α is half the angle μ such that the differential 14 pivots through half of the angle of the drive shaft 16.

Figure 4:
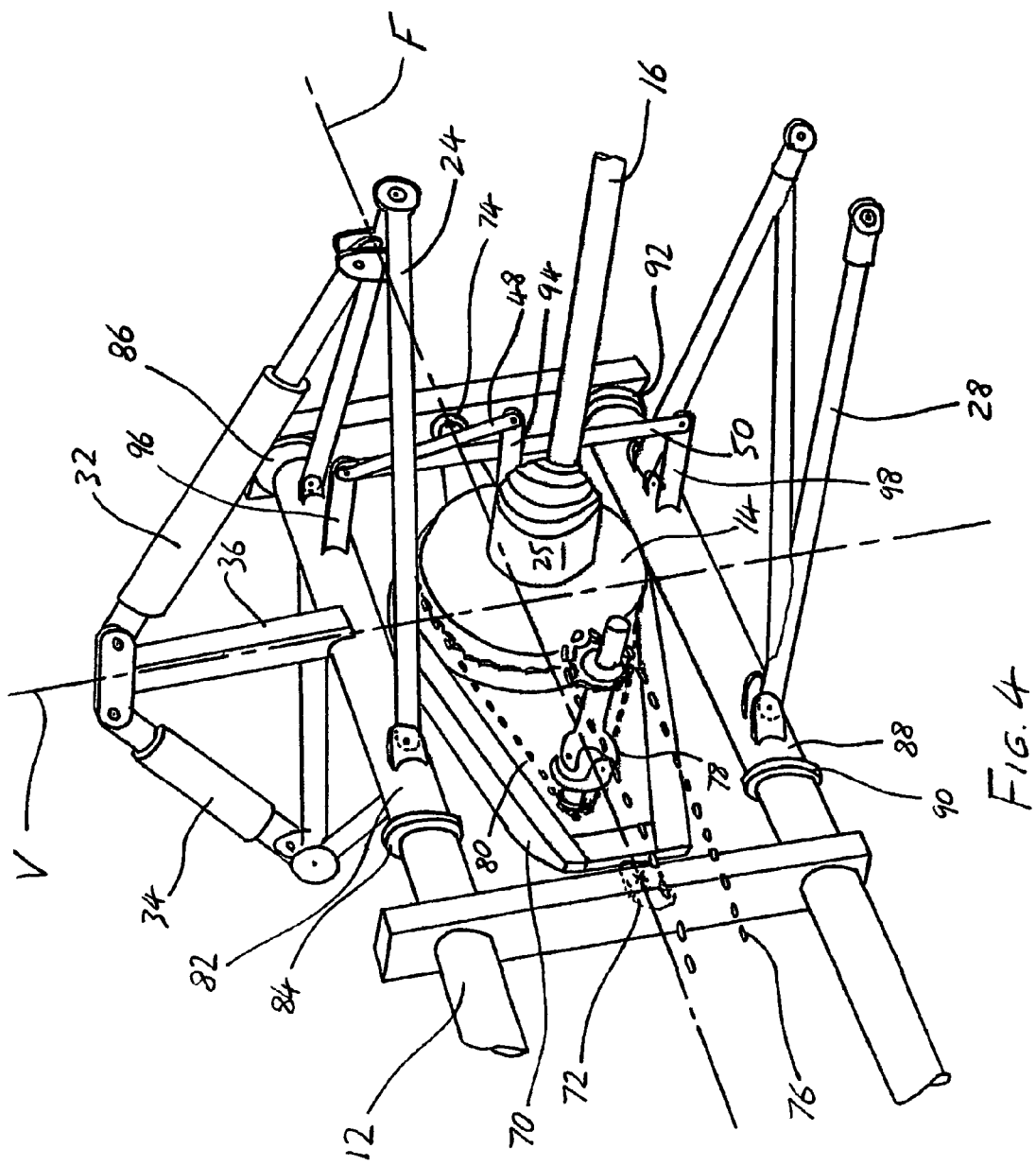
FIG. 4 is a perspective line drawing of the differential shown in FIG. 1.

FIG. 4 shows a perspective line drawing of the differential 14 of FIG. 1. In particular FIG. 4 shows the detail of the left hand side of the differential 14. The wheels 20, 22 have been omitted for clarity. In FIG. 4 the differential 14 is shown having a differential carrier 70. The differential carrier 70 is pivotably mounted to the frame 12 towards the front at 72 and towards the rear at 74. The pivot points 72, 74 lie on a front to back centre line F of the vehicle. A primary drive chain 76 from an engine (not shown) is connected to a universal coupling 78 which has a secondary chain 80 to drive the differential 14. The CV joint 25 between the differential 14 and the drive shaft 16 is also shown.

Also shown in FIG. 4 is the vertical centre line V passing through the frame arm 36. The frame arm 36 is fixed to a top collar 82 which is pivotably mounted on the frame 12 via bearings 84, 86. The top wish bone 24 is pivotably mounted to the top collar 82. A similar arrangement for the bottom wish bone 28 is shown towards the bottom of the frame 12 whereby the bottom wish bone 28 is pivotably mounted on a bottom collar 88.

The bottom collar 88 is pivotably mounted on the frame 12 vid bearings 90, 92. Also shown in FIG. 4 is the connection of the differential control arm 48 and the suspension control arm 50. One end of the differential control arm 48 is pivotably connected to a first member 94 which is fixed to the differential carrier 70. The other end of the differential control arm 48 is pivotably connected to a second member 96 which is fixed to the top collar 82. One end of the suspension control arm 50 is pivotably connected to the second member 96, the other end of the suspension control arm 50 is pivotably connected to a third member 98 which is fixed to the bottom collar 88. In FIG. 4 the universal joint 78 can be omitted if the engine (not shown) is arranged to pivot relative to the frame 12 in a similar manner to the pivoting to the differential 14 relative to the frame 12. It will also be appreciated that whilst drive chains 76, 80 are shown the drive chains 76, 80 could be substituted for a drive shaft from the engine (not shown).

Figure 5:
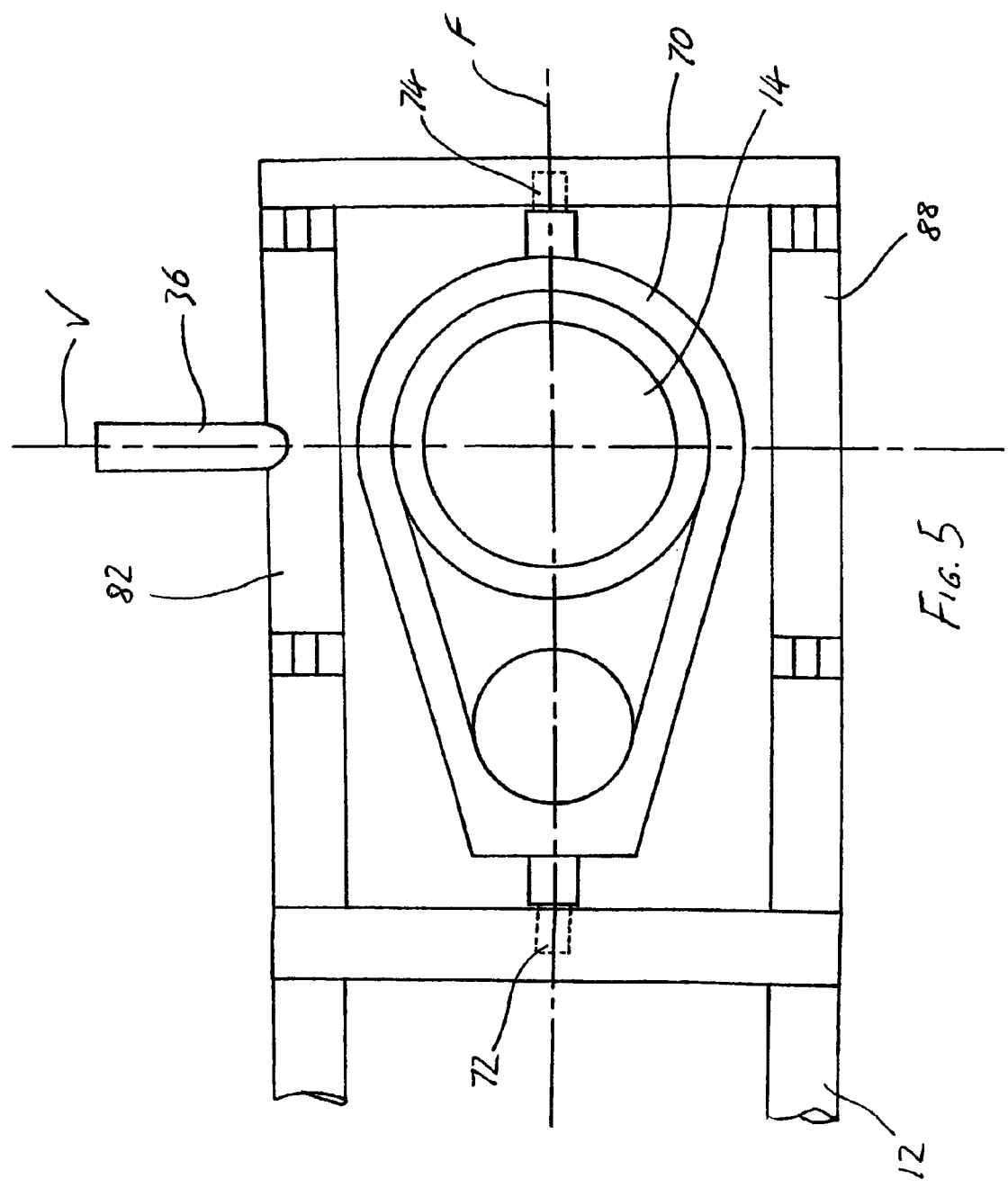
FIG. 5 is a schematic cross section from one side of the differential of FIG. 1.

Now turning to FIG. 5 there is shown a schema tic cross section from one side of the differential of FIG. 1. In FIG. 5 the differential carrier 70 is shown pivotably mounted to the frame 12 towards the front at 72 and towards the rear at 74. The top collar 82 and the bottom collar 88 are also shown pivotably mounted on the frame 12.

Figure 6:
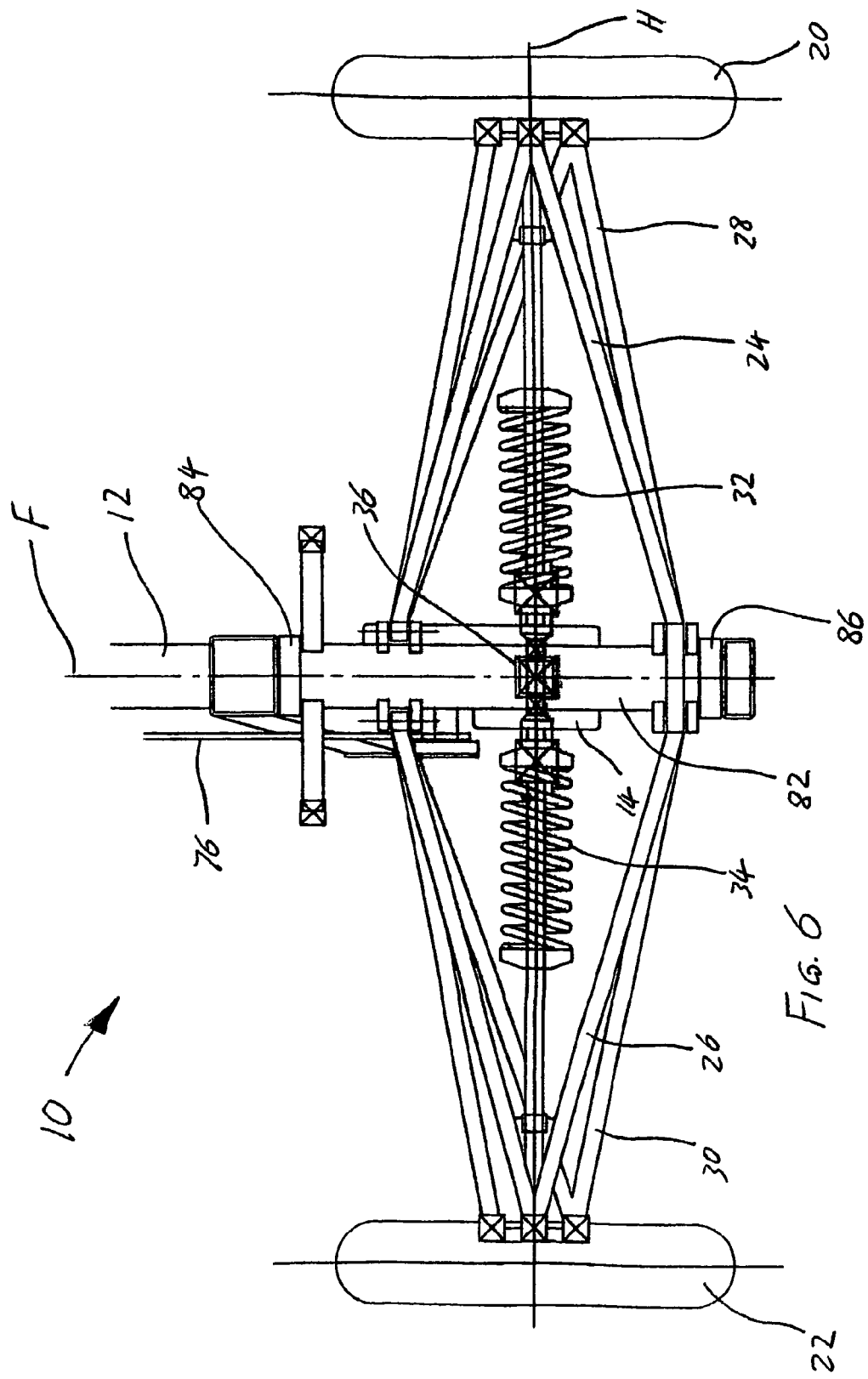
FIG. 6 is a schematic plan view of the driving wheels of FIG. 1.

In FIG. 6 there is shown a schematic plan view of the driving wheels of FIG. 1, generally designated 10. The horizontal centre line H, and the front to back centre line F of the frame 12 are shown. The top collar 82 pivotably mounted on the frame 12 with bearings 84, 86 is also shown. The frame arm 36 fixed to the top collar 82 and having suspension units 32, 34 pivotably connected thereto are also illustrated as well as the arrangement of the respective upper wishbones 24, 26 and the respective lower wishbones 28, 30. The primary drive chain 76 is illustrated running parallel to the front to back centre line F.

It will be appreciated that the set of driving wheels 10 and pivoting differential 14 described in FIGS. 1-6 could be used with any vehicle such as a three wheel or four wheel vehicle. When used with a four wheel vehicle two sets of driving wheels could be used to provide a four wheel drive vehicle.

A vehicle having a pair of driving wheels so described may have improved road holding characteristics when compared to a conventional non-tilting vehicle. Such a tilting vehicle may be operated with a higher cornering speed by virtue of the fact that the centre of gravity of the vehicle is lower to the ground as the vehicle tilts. Such a tilting vehicle may also have improved cornering safety. A vehicle so described combines the advantages of a two wheel motorcycle which tilts with the four wheels safety of a car.

It will be understood that various conventional changes to the suspension and drive shaft arrangement may be made to suit particular circumstances. For example, the ride height of the chassis may be adjusted with the consequence that the drive shafts may not be horizontal in the rest condition. The upper and lower drive shafts may be of unequal length so as to, for example, give a positive camber at rest.

The vehicle may further include a latch mechanism to maintain the chassis in the upright condition, for example for parking and low speed maneuvering. Such a latch could for example be a spring loaded plunger or the like which latches relatively tilting parts on demand.

It is envisaged that such a latch could be manually released, released on starting of the engine of the vehicle, or released as the vehicle exceeds a low speed, such as 5 mph.

In a three-wheeled vehicle incorporating the invention, footrests may be provided. Such footrests may be fixed for tilting with the chassis. However, in a preferred embodiment the footrests are pivotal about the fore and aft axis, the degree of pivoting being determined as a proportion of the degree of tilt by means of a respective control arm, in the manner of control arm 48. Such an arrangement may allow a more comfortable ride whilst maintaining ground clearance.

The invention claimed is:

1. A vehicle including a chassis having a fore and aft axis, a differential gear having a differential carrier, the differential carrier being pivotably mounted relative to the chassis about said axis, the differential gear having two opposite half shafts, each half shaft being connected to a respective wheel hub, the vehicle further including two opposite tie rods, each said wheel hub having one end of a respective tie rod pivotably connected thereto, the other end of the respective tie rod being pivotably connected to the chassis, the differential carrier and the chassis having a control arm pivotably attached therebetween, whereby on cornering of the vehicle the control arm constrains the differential carrier to pivot relative to said chassis, in a predetermined manner, wherein the respective tie rods are pivotably mounted on a common upper collar, the upper collar being pivotably mounted on the chassis above the differential carrier, wherein two further tie rods are provided below the respective half shafts, said further tie rods being pivotably mounted on a common lower collar, the lower collar being pivotably mounted on the chassis underneath the differential carrier, and wherein each of the upper and lower collars have a radius arm extending therefrom on the same side, a link being pivotably connected between the radius arms.

2. A vehicle according to claim 1, wherein the upper collar is coaxially mounted on an upper cylindrical member of the chassis.

3. A vehicle according to claim 1, wherein two further opposite tie rods are provided below the respective half shafts.

4. A vehicle according to claim 1, wherein said further tie rods are pivotably mounted on a common lower collar, the lower collar being pivotably mounted on the chassis underneath the differential carrier.

5. A vehicle according to claim 4, wherein the lower collar is coaxially mounted on a lower cylindrical member of the chassis.

6. A vehicle according to claim 1, wherein the radius arms are of equal length.

7. A vehicle according to claim 1, wherein the radius arms are parallel.

8. A vehicle according to claim 1, wherein the control arm is pivotably connected between one of the radius arms and a radius member of the differential carrier.

9. A vehicle according to claim 8, wherein the radius member is longer than the radius arm connected thereto.

10. A vehicle according to claim 9, wherein the radius member is twice as long as the associated radius arm.

11. A vehicle according to claim 8, wherein the radius member and the associated radius arm are parallel.

12. A vehicle according to claim 1, wherein the vehicle further includes a suspension means operatively connected between said chassis and respective wheel hubs and having opposite attachment points, said suspension means being operable to permit vertical movement of the chassis relative to the ground.

13. A vehicle according to claim 12, wherein the suspension means includes a chassis arm pivotably connected to the chassis, said chassis arm being pivotably connected to one of said attachment points, the suspension means further comprising opposite compressible suspension units, wherein both said units are pivotably connected to said chassis arm, and wherein the chassis arm extends from said upper collar, and is perpendicular to the ground in the upright rest condition of the vehicle.

14. A vehicle according to claim 1, wherein each half shaft is pivotably connected to a respective wheel hub via an outer universal joint, wherein each half shaft is pivotably connected to the differential gear with an inner universal joint, and wherein at least one of the respective inner and the outer universal joints provides for a change in length of the respective half shaft.

15. A vehicle according to claim 1, wherein the vehicle further includes an engine, the engine having a drive output perpendicular to said axis and driving a parallel lay shaft, the lay shaft having a universal joint connected to an input member of the differential gear, the input member being on said axis so as to provide for pivoting of the engine relative to the differential carrier.

16. A vehicle according to claim 1, wherein the engine is connected to the differential carrier.

* * * * *

UNITED STATES PATENT AND TRADEMARK OFFICE
CERTIFICATE OF CORRECTION

| | | |
|---|---|---|
| PATENT NO. | : 7,631,721 B2 | Page 1 of 1 |
| APPLICATION NO. | : 10/576401 | |
| DATED | : December 15, 2009 | |
| INVENTOR(S) | : Hobbs | |

It is certified that error appears in the above-identified patent and that said Letters Patent is hereby corrected as shown below:

Title page,

Item (86) PCT No.: "PCT/GB2004/310567" should read --PCT/GB2004/004346--.

Column 6,

Line 42, "claim 1" should read --claim 3--.

Signed and Sealed this
Twenty-eighth Day of December, 2010

David J. Kappos
*Director of the United States Patent and Trademark Office*